No. 628,094. Patented July 4, 1899.
D. H. B. HOOPER.
MACHINE FOR TRANSFERRING DIFFERENTIAL MOTION.
(Application filed Mar. 15, 1899.)
(No Model.)
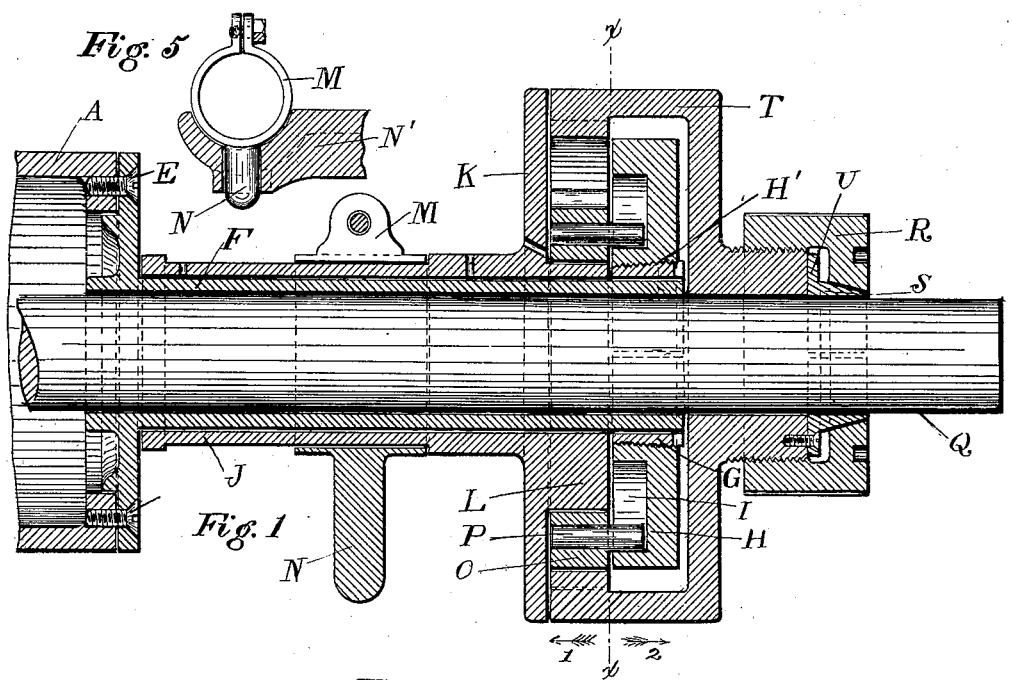
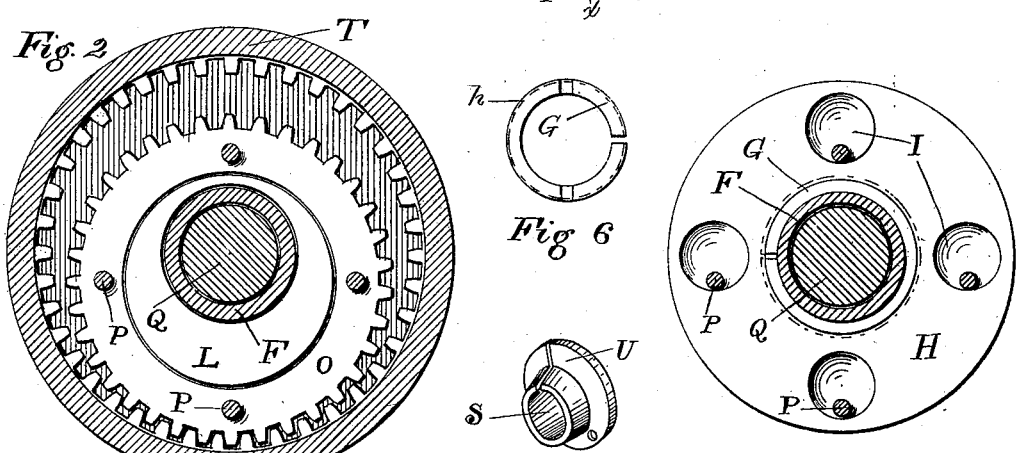
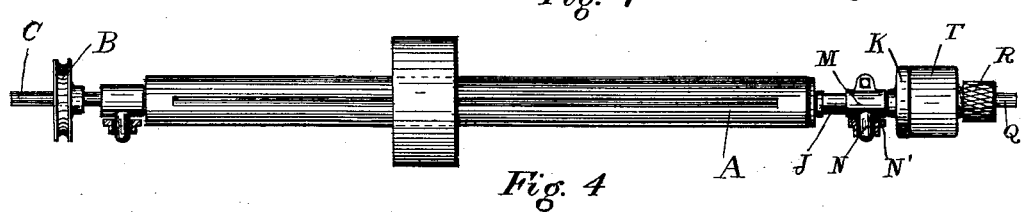
Witnesses:
Henry L. Chenery.
Marion Richards.
Inventor.
Daniel H. B. Hooper
by
Vinnie Griffin
his attorneys

UNITED STATES PATENT OFFICE.

DANIEL H. B. HOOPER, OF BIDDEFORD, MAINE.

MACHINE FOR TRANSFERRING DIFFERENTIAL MOTION.

SPECIFICATION forming part of Letters Patent No. 628,094, dated July 4, 1899.

Application filed March 15, 1899. Serial No. 709,220. (No model.)

*To all whom it may concern:*

Be it known that I, DANIEL H. B. HOOPER, a citizen of the United States, residing at Biddeford, in the county of York and State of Maine, have invented certain new and useful Improvements in Machines for Transferring Differential Motion; and I do hereby declare the following to be a full, clear, and exact description of the invention, such as will enable others skilled in the art to which it appertains to make and use the same.

My invention relates to improvements in machines for transferring differential motion; and it consists in a novel arrangement of the driving-plates, driven and driving gear, and in certain other details of construction, that will hereinafter be set forth and described.

The idea of the machine is to provide a simple and effective means for transmitting a differential rotary motion from one shaft to another, both shafts being in the same plane. In the device as shown in the drawings motion is transmitted at a ratio of seven to eight. As shown in the drawings, the gears are provided with thirty-five or forty teeth, respectively, so that a slower motion is imparted to the driven shaft in the ratio of seven to eight. In other words, when the driving-gear has made one revolution the driven gear still has one-eighth of a revolution to make in order to complete its whole revolution on or with its shaft. Any desired ratio of revolutions between the driving and driven shaft can be attained by simply changing the number of teeth in each gear, respectively; but I do not wish to limit myself to the exact ratio of revolutions, simply showing this ratio as a convenient way of illustrating my device.

My invention is especially designed to be attached to card-grinding machines where a different speed is required to revolve the shell of the grinder and the screw which causes the emery-wheel to travel back and forth. In card-grinding devices as previously constructed it has been customary and necessary to obtain the requisite differential revolutions between the shell and the screw by means of pulleys independently and differently mounted. This has not always been satisfactory and has caused much delay and labor in properly setting up the machine.

In the drawings herewith accompanying and forming a part of this application, Figure 1 is a horizontal sectional view of my device. Fig. 2 is a vertical section taken on line X X of Fig. 1 looking in the direction of arrow 1. Fig. 3 is a vertical section taken on lines X X of Fig. 1 looking in the direction of arrow 2. Fig. 4 is an elevation showing the adaptation of my device to the ordinary card-grinder roll. Fig. 5 is an elevation, partly in section, of my improved means for attaching the device to a carding-machine. Fig. 6 is a detail of the connection between the driver and the driving-shaft. Fig. 7 is a detail of the bushing employed by me for attaching the driven cylinder to the driven shaft.

Same letters refer to like parts.

In said drawings, A represents the cylinder or outer shell of a card-grinding machine. This may be driven in any suitable manner, as by means of a pulley B, running over a shaft C, which is made integral with the shell A. Attached to the shell A in any suitable manner, as by means of bolts or screws E, is an annular shaft F. Mounted on the extremity of said shaft and rigidly held in place by means of spring-clamp G or some other suitable means is a disk or driver H, provided with annular sockets I, arranged at equal distances apart on its surface. I preferably make this spring-clamp as shown in Fig. 6 in the drawings, where it is shown as a split ring provided with an inclined outer surface conforming to the equally-inclined interior bore of the driver. The interior bore of the driver is threaded, as seen at H', so that the threads h on the exterior of the split ring may fit thereon. When the ring is placed in position and screwed up, as the interior diameter of the interior bore of the driver grows slightly less the split ring will be compressed against the driving-shaft and prevent the driver from revolving thereon. Loosely mounted on said shaft F is a sleeve J, provided with a disk K and a cam L. This sleeve is prevented from rotating by means of the clamp-support M, having a foot N, adapted to fit in the puppet-head N' in a carding-machine. Adapted to rotate on said cam is an externally-toothed gear O, provided with spurs P. These spurs are adapted to fit in the holes I in the driving-disk. Attached to the shaft Q and held against rotation thereon by means of nut R and split bushing S is an internally-toothed gear T. The teeth in said internal gear are adapted to mesh with teeth on the periphery of the spur-gear O. When power is applied to the pulley connected by its shaft with the shell, motion is imparted to the hollow shaft E and thence to the driven disk. Thence for the reason that the spurs on the externally-toothed gear will engage the holes in the driving-disk motion is imparted to this disk, and as these teeth mesh with the teeth in the internally-toothed disk they impart motion thereto in proportion of seven to eight.

Previously it has been difficult to properly adjust the card-grinding device on the carding-machine so that the grinder will travel across the card and reverse and travel back again without, at the moment of reversing, grinding some of the teeth on the cards too much, as at either extremity of the card. In order to obviate this and to have a finer and nicer adjustment, I use a sliding spring-clamp, as before described. By means of this clamp sliding on the shaft the card-grinding device can be easily and nicely adjusted, without removing the machine from its supports, by simply sliding the whole shaft through the clamp, the clamp being loosened, so that the shaft can be moved in such manner as to obviate all difficulty as to the distance that has to be traversed by the grinding-wheel. The supports as previously constructed have consisted of a hollow sleeve having a foot or downwardly-extending lug, but not adapted to be clamped upon the shaft. In order to adjust said device, it has been necessary to take the whole machine out of its supports, remove the sleeve, and either reverse the same, for its longitudinal distance on each side of the downwardly-projecting lug is not the same, or, as is oftentimes the case, it is necessary to cut off portions of the shell, so that the grinder can be adjusted properly. This entails a great amount of unnecessary labor and waste of time, which is entirely obviated in my improved device. In order to hold the internally-toothed gear from revolution on the driven shaft and, further, to provide an easy and sure method of locking the same on its shaft, I use an improved form of bushing, as shown in Fig. 7 in the drawings, which shows a split ring tapering outwardly on its outer surface and provided with an annular flange U, adapted to fit closely against the end of the internally-toothed gear. A set-nut provided with an interior tapering surface conforming to the taper on the bushing is then screwed up against the said gear, compressing the split bushing, and consequently binding the said gear on its shaft. Sleeve J has for its function simply the supporting of the shafts, both driving and driven, and its disk, with the cam L on its surface, imparts an eccentric motion to the externally-toothed gear. Said sleeve does not revolve, and consequently the disk and its cam are held against rotation, the eccentric motion of the externally-toothed spur-gear O being brought about by it being caused to revolve on the cam L, made rigid with the disk K and sleeve J.

The advantages of my improved device are that it provides a simple, effective, and cheap means for imparting a differential motion and, furthermore, affords an effective and ready means for adjustment.

Having thus described my invention and its use, I claim—

1. In a machine for imparting differential rotary motion, in combination, a hollow sleeve, a plate on the end thereof, an eccentric on said plate, said sleeve being held against rotation by a sliding spring-clamp, a spur-gear adapted to rotate on said eccentric and means for imparting a rotary motion to said spur-gear, substantially as and for the purposes set forth.

2. In a machine for imparting differential rotary motion, in combination, a driving-shaft, a disk rigidly mounted on one end thereof, said disk being provided with annular sockets, a spur-gear provided with outwardly-extending lugs adapted to fit in said sockets, an internally-toothed gear adapted to mesh with the spur-gear, means for holding said internally-toothed gear, rigidly on its shaft, a cam on which said spur-gear revolves and means for holding said cam against revolution, substantially as and for the purposes set forth.

3. In a machine for transferring differential rotary motion in combination, a driving-shaft having a disk with annular sockets on its surface rigidly attached to one extremity, an externally-threaded gear mounted on an eccentric and provided with lugs on its surface, said lugs adapted to fit in the sockets in the disk and means for holding said eccentric stationary, substantially as and for the purposes set forth.

4. In a machine for imparting differential rotary motion, an annular driving-shaft, a driver rigidly attached thereto, said driver being provided with annular sockets in its face, an externally-toothed gear with spurs on its surface, said spurs adapted to engage the annular sockets in the driver, a driven shaft, an internally-toothed shell mounted thereon, the teeth on the gear adapted to mesh with the teeth on said shell and means for holding said driver and shell rigid on their respective shafts, substantially as and for the purposes set forth.

5. In a machine for transferring differential rotary motion, an annular driving-shaft, a driver rigidly attached thereto, said driver being provided with annular sockets in its face, an externally-toothed gear, with spurs on its surface, said spurs adapted to engage the annular sockets in the driver, a driven shaft, an internally-toothed shell mounted thereon, the teeth on the gear adapted to mesh with the teeth on said shell and a split bushing provided with an annular lip adapted to fit closely to said shell, an internally-threaded set-nut adapted to be set up against said shell and compress said bushing, substantially as and for the purposes set forth.

In testimony whereof I affix my signature, in presence of two witnesses, this 6th day of March, A. D. 1899.

DANIEL H. B. HOOPER.

Witnesses:
LEWIS P. SHERMAN,
ERWIN S. DROWN.